3,197,277
PREPARATION OF SODIUM CHLORIDE HAVING
VERY LOW BULK DENSITY
Edward Graham Cooke, Northwich, England, assignor to Imperial Chemical Industries Limited, London, England, a corporation of Great Britain
No Drawing. Filed Apr. 5, 1962, Ser. No. 185,197
Claims priority, application Great Britain, Apr. 21, 1961, 14,496/61
12 Claims. (Cl. 23—89)

This invention relates to a process for treating sodium chloride, particularly to a process for consolidating sodium chloride into masses having densities lower than those possessed by known forms of consolidated sodium chloride.

It is known to make blocks of sodium chloride, salt, by taking wet salt made from brine by evaporation in open pans ("open-pan salt"), moulding it to the desired shape, and subsequently baking to remove moisture. It is also known to make blocks of crushed rock-salt, and of salt made by the evaporation of brine under reduced pressure ("vacuum salt"), by mixing the salt with water containing a binder, for example gelatine, subsequently moulding, extruding or otherwise shaping the damp mass and finally drying it. Consolidated salt made in these ways usually has a density of from 0.90 to 1.2 g./cc.

A method has now been found for consolidating salt to give masses whose density is much lower, for example from about 0.50 to 0.70 g./cc., and which on subsequent grinding give a particulate salt possessing similar low density.

According to this invention there is provided a process for making a mass of salt (sodium chloride) comprising making a suspension, magma or paste of the salt in brine or other fluid in the presence of a binding agent, inflating said suspension, magma or paste by means of air or other gas that does not react chemically with the ingredients and subsequently drying it to remove all or some of the water or other fluid to give a coherent mass.

By salt (sodium chloride) is understood not only raw natural salt, for example crushed rock salt, and salt made by the evaporation of brine at atmospheric pressure in open pans, and at reduced pressure in vacuum evaporators, but also salt produced by solar evaporation, and also special forms of salt made in evaporation processes, for example salt in the form of three-dimensional dendrites and in the form of granules, and salt containing additives for various purposes.

Examples of binding agents are gelatine; gums, for example gum acacia; albumens, for example blood albumen, egg albumen; casein; starches and dextrins; alkyl celluloses. The function of the binding agent is believed to be two-fold, namely to assist in binding the salt into a mass and also to exert the effect of a skin, membrane or film in retaining within the mass the air or other gas that inflates it. The proportion of binding agent is generally less than 5% by weight of the salt and is preferably between 0.10 and 0.50%. When the salt is intended for domestic use the binding agent chosen will be non-toxic and preferably one that does not impart colour to salt.

To inflate the suspension, magma or paste of salt and binding agent the inflating gas may be led in from outside and distributed and entrained mechanically, or it may be generated in situ. For example, sodium bicarbonate, or ammonium bicarbonate, may be mixed in with the salt and binder and on subsequent heating they will generate respectively carbon dioxide, and a mixture of carbon dioxide and ammonia, within the mass and thereby inflate it. Other gas-producing compounds may be used and liquids other than water may constitute some or all of the liquid phase of the suspension, magma or paste.

The inflated moist mass of salt may be shaped in moulds and in other ways and then heated to drive off water or other liquid and to give a coherent mass. According to another aspect of the invention the inflated moist mass may be spray-dried to give a fine-grained salt having low density.

The invention is illustrated but not restricted by the following examples. The first two show how the inflating gas may be generated in situ.

Example 1

To 2 kg. of dendritic salt were added 240 cc. of a 5% aqueous solution of gelatine and 20 g. of sodium bicarbonate. These were well mixed for 2 minutes in a blending machine, and the resultant mixture placed in rectangular metal moulds fitted with perforated lids. The moulds and contents were placed in an oven operating at a temperature of 150° C. for 12 hours. The block removed from the mould after cooling was hard, strong and had a density of 0.62 g./cc. Blocks made in a similar way from dendritic salt using the same quantity of water but omitting the other constituents had a density of 0.94 g./cc.

Example 2

1000 g. of dendritic salt were mixed intimately with 5 g. of gluten, 100 g. of water and 10 g. of ammonium bicarbonate. This mixture was placed in moulds and heated in an oven as described in Example 1. The resultant blocks were coherent and had a density of 0.66 g./cc.

Example 3

200 cc. of a 1% aqueous solution of gelatine were added to 2000 g. of dendritic salt and the mixture stirred in an incorporator for 6 minutes, after which time the mixture had assumed a cream-like consistency due to the entrainment of air. This mixture was ladled into moulds which were then placed in an oven operating at 150° C. for 12 hours. On removing the dry blocks from the mould, they were found to be hard, coherent and to have a density of 0.55 g./cc.

Example 4

200 cc. of a 2% aqueous solution of gelatine were added to 2000 g. of cubic vacuum salt of fine particle-size, and the mixture treated in a similar way to that described in Example 3. The resultant dry block had a density of 0.63 g./cc. Blocks made from the same mixture of salt and gelatine solution, but which was not mixed so as to entrain air, had a density, when dry, of 1.1 g./cc.

Example 5

270 cc. of a 1.5% aqueous solution of casein were added to 2000 g. of dendritic salt. The mixture was mixed in an incorporator for 23 minutes in order to obtain the cream-like consistency associated with entrained air. Dry moulded blocks made from this mixture had a density of 0.65 g./cc.

What is claimed is:

1. A process for making a light weight salt mass which comprises inflating an aqueous mixture of sodium chloride and a binding agent with an inflating gas which is chemically inert with respect to said mixture and thereafter drying said mixture to remove water, said binding agent being selected from the class consisting of gelatin, gluten, gums, albumens, casein, starches, dextrins and alkyl celluloses, said inflating gas being selected from the group consisting of carbon dioxide generated in situ from sodium and ammonium bicarbonates, and air.

2. A process for making a light weight salt mass having a bulk density lower than that possessed by known forms of sodium chloride which comprises adding an inflating agent to an aqueous mixture of salt and a binding agent to produce a moist mass of salt, said inflating agent being chemically inert with respect to said aqueous mixture and said inflating agent being selected from the group consisting of carbon dioxide generated in situ from sodium and ammonium bicarbonates, and air, said binding agent being incorporated in an amount less than about 5% based on the weight of the salt and being selected from the class consisting of gelatin, gluten, gums, albumens, casein, starches, dextrins, and alkyl celluloses, and heating said moist mass of salt to drive off water and give a coherent and inflated light weight salt mass.

3. A process for producing a light weight salt mass having a bulk density below about 0.90 gram per cubic centimeter which comprises the steps of adding salt to an aqueous mixture containing less than about 5% by weight, based on the weight of the salt, of a binding agent, said binding agent being selected from the group consisting of gelatin, gluten, gums, albumens, casein, starches, dextrins and alkyl celluloses, said binding agent assisting in binding the salt into a mass and exerting a membrane effect for retaining an inflating agent, mixing said aqueous mixture of binding agent and salt with an inflating agent selected from the class consisting of carbon dioxide generated in situ from sodium and ammonium bicarbonates, and air, to give a moist salt mass, and drying the same to give a light weight salt mass.

4. The process of claim 3 wherein the salt added to the aqueous mixture is dendritic salt.

5. The process of claim 3 wherein the amount of binding agent lies within the range of about 0.10 to about 0.5%, based on the weight of the salt.

6. The process of claim 3 wherein the inflating agent is carbon dioxide generated in situ by incorporation of the bicarbonate followed by heating to about 150° C.

7. The process of claim 3 wherein the density of the light weight salt mass lies within the range of about 0.50 to about 0.70 gram per cubic centimeter.

8. The process of claim 3 wherein the moist salt mass is produced by blending in air and then heating to drive off water and give a coherent light weight salt mass.

9. The process of claim 3 including the step of subsequently grinding the light weight salt mass to give particulate salt of bulk density less than 0.70 gram per cubic centimeter.

10. A light weight salt mass having a bulk density lower than that possessed by known forms of consolidated sodium chloride and below about 0.90 gram per cubic centimeter, comprising a coherent inflated substantially dry mass consisting of salt, an inflating agent and less than about 5% by weight, based on the weight of the salt, of a binding agent, said binding agent assisting in binding the salt into a mass and exerting a skin effect to retain the inflating agent within the salt mass, said inflating agent being chemically inert with respect to the ingredients of said mass, said inflating agent being selected from the group consisting of carbon dioxide generated in situ from sodium and ammonium bicarbonates, and air, and said binding agent being selected from the class consisting of gelatin, gluten, gum, albumens, casein, starches, dextrins and alkyl celluloses.

11. The light weight salt mass of claim 10 wherein the amount of binding agent lies within the range of about 0.10 to about 0.50, based on the weight of the salt.

12. The light weight salt mass of claim 10 wherein the bulk density lies within the range of about 0.50 to about 0.70 gram per cubic centimeter.

References Cited by the Examiner

UNITED STATES PATENTS

| | | | |
|---|---|---|---|
| 462,730 | 11/91 | Ongley | 23—89 X |
| 768,230 | 8/04 | Knox | 23—150 |
| 1,734,260 | 11/29 | Lamont | 23—293 |
| 1,950,459 | 3/34 | Seifert. | |
| 2,018,633 | 10/35 | Boller | 23—89 X |
| 2,206,916 | 7/40 | Olsen et al. | 252—382 X |
| 2,421,185 | 5/47 | Comstock | 23—89 X |
| 2,539,012 | 1/51 | Diamond | 23—89 X |
| 2,664,357 | 12/53 | Miller | 23—89 X |
| 3,000,724 | 9/61 | Langlois | 71—39 |
| 3,011,897 | 12/61 | Grosvenor | 99—141 |
| 3,048,478 | 8/62 | Smith | 23—89 X |

FOREIGN PATENTS

| | | |
|---|---|---|
| 268,181 | 3/27 | Great Britain. |

OTHER REFERENCES

J. W. Mellor's "A Comprehensive Treatise on Inorg. and Theoretical Chem.," volume 4, 1923 Edition, page 352; Longmans, Green & Co., New York.

MAURICE A. BRINDISI, *Primary Examiner.*

GEORGE D. MITCHELL, *Examiner.*